(12) United States Patent
    Tanaka

(10) Patent No.: US 9,396,407 B2
(45) Date of Patent: Jul. 19, 2016

(54) IMAGE RECOGNITION DEVICE, RECORDING MEDIUM, AND IMAGE RECOGNITION METHOD

(71) Applicant: OMRON Corporation, Kyoto-Shi (JP)

(72) Inventor: Kiyoaki Tanaka, Kizugawa (JP)

(73) Assignee: OMRON CORPORATION, Kyoto-shi (JP)

( * ) Notice: Subject to any disclaimer, the term of this patent is extended or adjusted under 35 U.S.C. 154(b) by 155 days.

(21) Appl. No.: 14/223,411

(22) Filed: Mar. 24, 2014

(65) Prior Publication Data

US 2014/0307974 A1    Oct. 16, 2014

(30) Foreign Application Priority Data

Apr. 12, 2013 (JP) ................................. 2013-084370

(51) Int. Cl.
   *G06K 9/68*   (2006.01)
   *G06K 9/62*   (2006.01)
   *G06K 9/00*   (2006.01)
   *G06K 9/72*   (2006.01)

(52) U.S. Cl.
   CPC .............. *G06K 9/62* (2013.01); *G06K 9/00664* (2013.01); *G06K 9/72* (2013.01)

(58) Field of Classification Search
   None
   See application file for complete search history.

(56) References Cited

U.S. PATENT DOCUMENTS

| 6,287,197 | B1 * | 9/2001 | Dickinson | A63F 13/10 273/273 |
| 6,947,596 | B2 * | 9/2005 | Kashioka | G06K 9/346 382/176 |
| 7,137,076 | B2 * | 11/2006 | Iwema | G06K 9/00436 345/179 |
| 8,724,908 | B2 * | 5/2014 | Dale | G06K 9/6254 382/224 |

FOREIGN PATENT DOCUMENTS

| JP | 2000-011095 A | 1/2000 |
| JP | 2010-009440 A | 1/2010 |

* cited by examiner

*Primary Examiner* — Daniel Mariam
(74) *Attorney, Agent, or Firm* — Nutter McClennen & Fish LLP; John J. Penny, Jr.

(57) ABSTRACT

An image recognition device for recognizing respective types of display objects appearing in an image is provided, the image recognition device comprising: a change object selecting unit configured to select a change object, a target whose recognition result is to be modified, from the display objects and to determine that a type of each determined object is a type of one of recognition candidates which has the highest degree of reliability, the determined objects being not the change object; a pair object selecting unit configured to select a pair object from the determined objects, the pair object making a pair with the change object; and a recognition processing unit configured to modify the recognition result of the change object and to identify the change object, on the basis of a pair information list that indicates an object type associated with a type of the pair object.

12 Claims, 5 Drawing Sheets

IMAGE RECOGNITION DEVICE, RECORDING MEDIUM, AND IMAGE RECOGNITION METHOD

CROSS-REFERENCE TO RELATED APPLICATION(S)

This application claims the benefit of priority from Japanese Patent Application No. 2013-084370, filed on 12 Apr. 2013, the entire contents of which is incorporated herein by reference for all purposes.

BACKGROUND

The present invention relates to an image recognition device, a recording medium storing an image recognition program, and an image recognition method, which recognize a type of a display object appearing in an image.

In general, recognition of objects, letter strings, and others contained in an image is called image recognition. In particular, the image recognition that identifies a type of an object contained in an image on the basis of its shape, color, behavior or the like is called general object recognition.

In recent years, many studies have been conducted on the image recognition, including the general object recognition, and accurate image recognition has been pursued. However, no image recognition devices that can provide image recognition that identifies correctly and accurately an object in an image still have been realized.

Accordingly, various techniques for improving the accuracy of the image recognition have been developed.

To give an example, Japanese Unexamined Patent Publication No. 2010-9440 (publication date: Jan. 14, 2010) describes a recognition device that recognizes a letter string from image information and further modifies the obtained letter recognition result.

More specifically, the technique described in the document above first subjects a letter string contained in image information to image identification processing, and thereby estimates the respective candidate letters for letters making up the letter string. Then, the recognition device creates a candidate letter string, which is the candidate for the letter string, by combining the candidate letters. Finally, the recognition device identifies the letter string contained in the image information by checking the candidate letter string against words in word registration information.

According to the description of the document above, the recognition device can recognize letter strings through low-load processing.

To give another example, Japanese Unexamined Patent Publication No. 2000-11095 (publication date: Jan. 14, 2000) describes a method of modifying a letter recognition result. In this method, a letter string resulting from the reading of letters with an OCR is modified in reference to letter strings contained in a frequently-appearing word list. Specifically, the method first extracts a part of the OCR reading result as a sample, and then extracts, from this sample, a letter string which is similar to a prepared word registered in the frequently-appearing word list. Next, the method creates an erratum in which the extracted letter string is related to the prepared word, and finally modifies the OCR reading result by using this erratum.

Both of the techniques described in Japanese Unexamined Patent Publication No. 2010-9440 and Japanese Unexamined Patent Publication No. 2000-11095 recognize a letter string in an image, and modify the recognized result. However, no techniques have been disclosed so far, for recognizing any given display object within an image in addition to a letter string and modifying the recognized result. The present invention addresses the above disadvantage and an object thereof is to provide an image recognition device and the like which are capable of identifying accurately a type of a display object appearing in an image.

SUMMARY

According to at least one embodiment of the present invention, there is provided an image recognition device for recognizing respective types of display objects appearing in an image, and obtains, for each display object, one or more recognition candidates, each of the one or more recognition candidates has a degree of reliability that indicates a likelihood as a result of recognizing the types of the display objects, the image recognition device comprising: a change object selecting unit configured to select a change object from the display objects and to determine that a type of each determined object is a type of one of the one or more recognition candidates which has the highest degree of reliability, the change object being a target whose recognition result is to be modified and the determined objects being not the target whose recognition result is to be modified; a pair object selecting unit configured to select a pair object from the determined objects of the display objects, the pair object making a pair with the change object; and a recognition processing unit configured to modify the recognition result of the change object and to identify the change object, on the basis of a pair information list that indicates an object type associated with a type of the pair object.

According to at least one embodiment of the present invention, there is provided an image recognition method of recognizing respective types of display objects appearing in an image, and obtaining, for each display object, one or more recognition candidates, each of the one or more recognition candidates has a degree of reliability that indicates a likelihood as a result of recognizing the types of the display objects, the image recognition method comprising: selecting a change object from the display objects and determining that a type of each determined object is a type of one of the one or more recognition candidates which has the highest degree of reliability, the change object being a target whose recognition result is to be modified and the determined objects being not the target whose recognition result is to be modified; selecting a pair object from the determined objects of the display objects, the pair object making a pair with the change object; and modifying the recognition result of the change object and identifying the change object, on the basis of a pair information list that indicates an object type associated with a type of the pair object.

DETAILED DESCRIPTION

Embodiment 1

Thereinafter, an embodiment of the present invention will be described in detail with reference to FIGS. 1 to 5.

Figure 1:
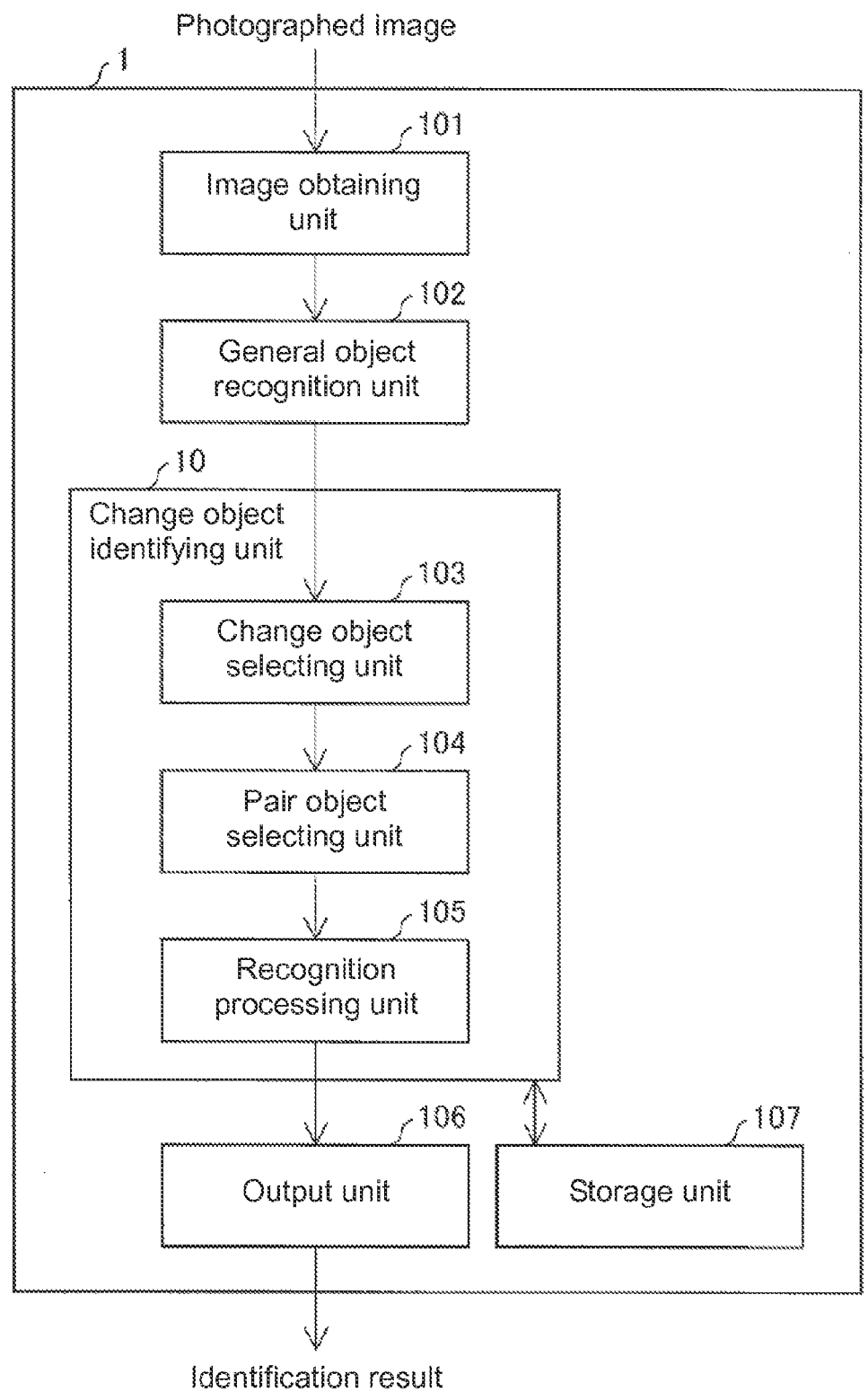
FIG. 1 is a block diagram showing a configuration of an image recognition device according to Embodiment 1 of the present invention.

A description will be given of a configuration of an image recognition device 1 according to the present embodiment, with reference to FIG. 1. FIG. 1 is a block diagram showing a configuration of the image recognition device 1.

As shown in FIG. 1, the image recognition device 1 includes an image obtaining unit 101, a general object recognition unit 102, a change object identifying unit 10, an output unit 106, and a storage unit 107.

The image obtaining unit 101 obtains an image from the exterior of the image recognition device 1, such as an image photographing device or an image database. The image obtaining unit 101 then outputs the image obtained in this manner to the general object recognition unit 102.

The general object recognition unit 102 subjects the image received from the image obtaining unit 101 to the general image recognition. In more detail, the general object recognition unit 102 recognizes respective types of objects contained in the image on the basis of their shapes, colors, behaviors, or the like. Each object recognized by the general object recognition unit 102 typically has one or more recognition candidates; each recognition candidate for a certain object has a likelihood that this object is identified as the recognition candidate, or its degree of reliability.

Figure 2:
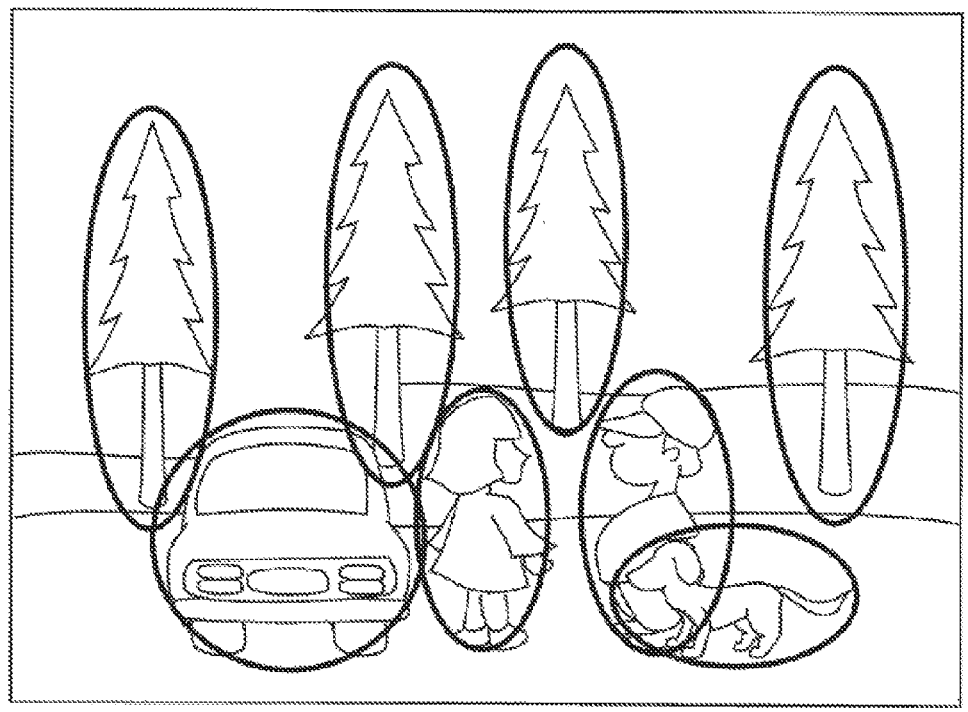
FIG. 2 shows an exemplary image explaining exemplary general object recognition applied to the image.

FIG. 2 shows an exemplary image, which is a target to be subjected to the general object recognition by the general object recognition unit 102. In FIG. 2, eight objects housed by ellipses are to be recognized by the general object recognition unit 102. The general object recognition unit 102 outputs recognition candidates for each of the eight objects.

The change object identifying unit 10 modifies the object recognition result received from the general object recognition unit 102. In more detail, the change object identifying unit 10 selects an object whose object recognition result has a low degree of reliability as a change object, and modifies this object recognition result, thereby identifying this change object as an object with a higher likelihood. Details of the change object identifying unit 10 will be described below.

The output unit 106 outputs the image processing result received from the change object identifying unit 10 to the exterior of the image recognition device 1. For example, the output unit 106 may output this image processing result to any given type of image application.

The storage unit 107 stores a pair information list, which is a list of pair information associated with an object.

(Pair Information)

There is no specific limitation on the pair information associated with an object; however, for example, the pair information may be decided in the following manner.

After a photographed image stored in a database is subjected to the general object recognition, two objects, or two determined objects that would often be present together in the same image, are selected from identified objects in the image, and one of the determined objects is set as pair information for the other.

Note that a high-performance image recognition device (that has a higher image recognition ability than the image recognition device 1) is desirably used to subject the general object recognition to the image in the database. This is because with a high-performance image recognition device, an object in the image can be identified more correctly, and the pair information can be decided using this object. In this case, since no prompt processing for generating the pair information is essentially required, a high-performance image recognition device, as described above, can be used.

Alternatively, two objects that are typically or empirically used in combination or arranged in a pair may be selected from the identified objects, and one of the selected objects may be set as pair information for the other.

When the configuration above is employed, the pair information list for a desk contains, for example, a chair and a person. The pair information list for a personal computer (PC) contains, for example, a keyboard and a mouse. The pair information list for a dog contains, for example, foods, a dog collar and a chain.

(Change Object Identifying Unit 10)

As shown in FIG. 1, the change object identifying unit 10 includes a change object selecting unit 103, a pair object selecting unit 104, and a recognition processing unit 105.

Details of the components configuring the change object identifying unit 10 will be described in order.

(1. Change Object Selecting Unit 103)

The change object selecting unit 103 selects, from objects in the image which have been recognized by the general object recognition unit 102, one or more objects (referred to below as change objects) that become targets whose recognition results are to be changed.

Figure 3:
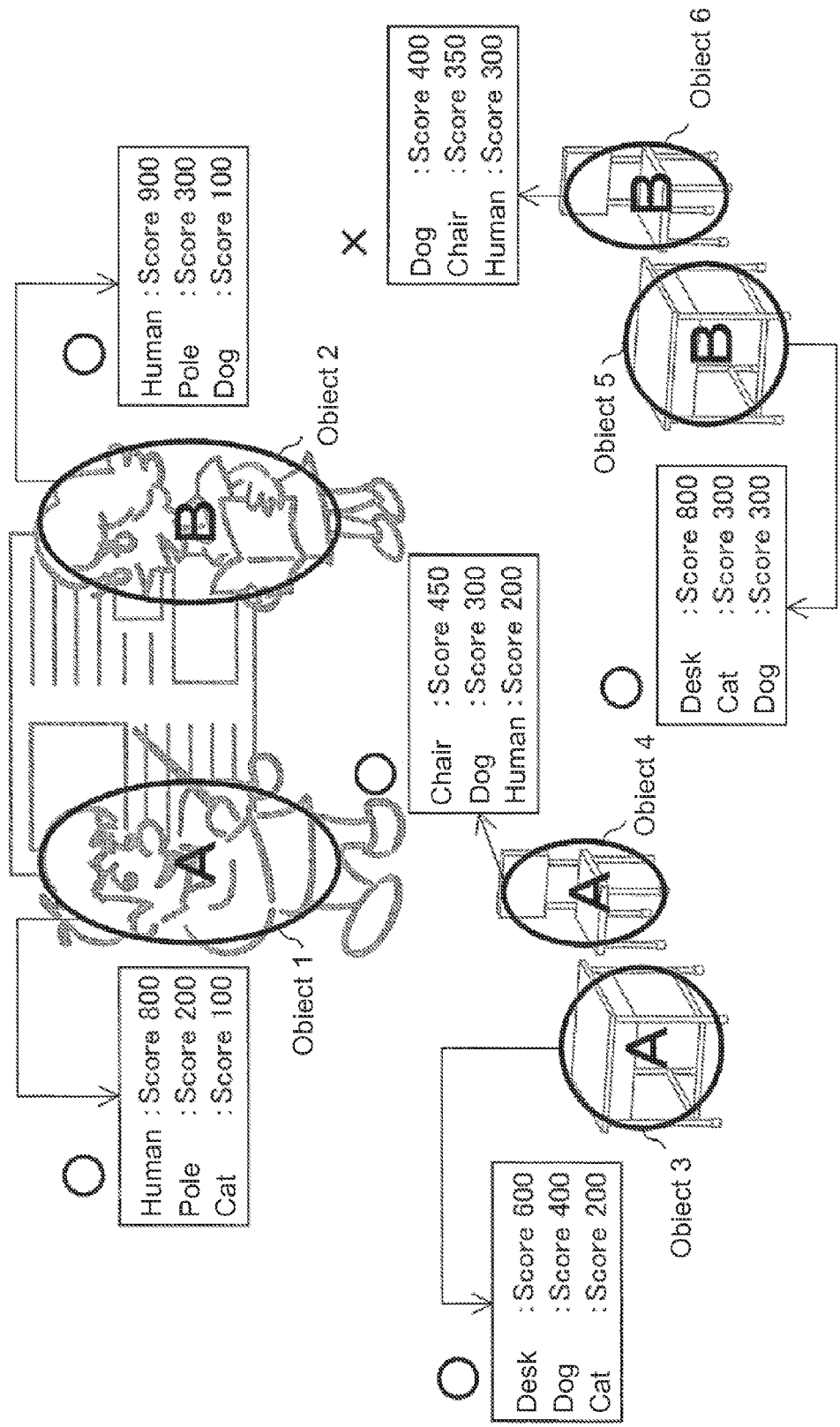
FIG. 3 shows an exemplary image explaining the general object recognition performed by the image recognition device shown in FIG. 1.

In FIG. 3, the recognition results that have been provided by the general object recognition unit 102 for some objects are shown. For example, the object 5 is indicated with recognition candidates ("desk," "cat" and "dog") and scores (800, 300 and 300) indicating the degrees of reliability of these recognition candidates.

To give a first example, the change object selecting unit 103 sets a preset threshold, and regards a display object (an object appearing in an image) with the highest score equal to or lower than the preset threshold, as a change object; the highest score is the highest one of scores (see FIG. 3) indicating the degrees of reliability of the recognition candidates. In the case where the threshold is set to 500 in the example of the image shown in FIG. 3, the object 4 (highest score: 450) and the object 6 (400) are regarded as change objects.

The change object selecting unit 103 then identifies each of the objects other than the change objects (objects 4 and 6) as its recognition candidate with the highest score. The identified objects are referred to below as determined objects.

When there is no display objects having a highest score exceeding the threshold in the whole image or when no other display objects are disposed within a preset range of a distance from a display object having the highest score in the image, the change object selecting unit 103 may regard only the display object having the highest score as a determined object, and the other display objects as change objects.

To give a second example, the change object selecting unit 103 selects, from the recognition candidates of each object recognized by the general object recognition unit 102, one recognition candidate having the highest score for each object, and compares these highest scores to identify the recognition candidate having the lowest score. Then the change object selecting unit 103 regards the object having this recognition candidate as a change object. If this configuration is applied to the image shown in FIG. 3, the object 6 having the highest score of 400 is regarded as the change object.

(2. Pair Object Selecting Unit 104)

The pair object selecting unit 104 selects objects (referred to below as pair objects) that make respective pairs with change objects selected by the change object selecting unit 103. The pair object for a certain change object is one or more selected objects selected from determined objects in an image in which this change object is present.

(Concrete Example of Processing for Selecting Pair Object)

A description of exemplary processing through which the pair object selecting unit 104 selects a pair object will be given below.

Example 1

In Example 1 of a method of selecting a pair object, the pair object selecting unit 104 selects, from determined objects disposed around a change object in an image, one having the recognition candidate with the highest score, as the pair object for this change object.

Example 2

In Example 2 of a method of selecting a pair object, the pair object selecting unit 104 selects, as a pair object, one of determined objects which is disposed the closest to a change object in an image. With this method, a determined object that is disposed close to a change object and would be closely related to the change object can be selected as the pair object, in priority to other determined objects.

For example, in the case where the object 6 is a change object in FIG. 3, the object 5 disposed the closest to the object 6 in the image is selected as the pair object for the object 6. In this case, if the object 6 is not identified using the object 5 as the pair object for the object 6, the object 2, which is disposed the second closest to the object 6 in the image, may be newly selected as the pair object for the object 6.

Example 3

In Example 3 of a method of selecting a pair object, when a plurality of determined objects are present around a change object, the pair object selecting unit 104 selects one of the determined objects which belongs to the type for which the number of the determined objects is the largest, as the pair object.

Suppose the objects 1 to 5 are determined objects and the object 6 is a change object in the image shown in FIG. 3. Further, the objects 1 to 5 are identified as a person, a person, a desk, a chair and a desk, respectively.

"Person" corresponds to two (objects 1 and 2) of the objects 1 to 5; likewise "desk" corresponds to two (objects 3 and 5) of the objects 1 to 5. In other words, the objects 1, 2, 3 and 5 belong to the type for which the number of the determined objects is the largest. Consequently, the object 1, 2, 3 or 5 is regarded as the pair object for the object 6.

In the case above, for example, the pair object selecting unit 104 may refer to the respective degrees of reliability of the objects 1, 2, 3 and 5, and determine that one of the objects 1, 2, 3 and 5 which has the highest degree of reliability is the pair object.

Example 4

In Example 4 of a method of selecting a pair object, when a plurality of change objects are present in an image, the pair object selecting unit 104 selects the respective pair objects for the change objects, in a decreasing order of highest score among the recognition candidates of each change object. Suppose that a first change object and a second change object are present; a recognition candidate in the first change object has a higher score than that of a second change object. The pair object selecting unit 104 first selects the pair object for the first change object, and then the pair object for the second change object. A reason for this is as follows.

First, if the recognition candidate for a change object has a higher score, there is a greater probability that this change object has been recognized correctly by the general object recognition unit 102. Since the recognition candidate of the first change object which has a higher score than that of the second change object, there is greater probability that the first change object will be identified more correctly than the second change object by the recognition processing unit 105.

Second, when the pair object selecting unit 104 selects the pair object for the first change object having a recognition candidate with a higher score, the first change object has been identified before the pair object for the second change object is selected. In this case, in selecting the pair object for the second change object, the pair object selecting unit 104 can use the identified first change object as the pair object for the second change object.

As described above, there is a greater probability that the first change object will be identified more correctly than the second change object. If the first change object has been identified correctly, the pair information in the identified first change object is quite likely to contain information for identifying the second change object correctly.

Thus, when the identified first change object has been selected as the pair object for the selection of the pair object of the second change object, the recognition processing unit 105 is quite likely to identify the second change object correctly, on the basis of the pair information of the identified first change object.

If the pair object selecting unit 104 selects the pair object for the second change object whose recognition candidate has a lower score before selecting the pair object for the first change object, there is a greater probability that the second change object will be identified erroneously. Moreover, (after the second change object is identified erroneously,) if the identified second change object is selected as the pair object for the selection of the pair object of the first change object, the recognition processing unit 105 will have difficulty in identifying the first change object correctly, on the basis of the pair information of the identified second change object.

For the reason above, when a plurality of change objects are present in an image, it is preferable for the recognition processing unit 105 to identify change objects in a decreasing order of highest score among the recognition candidates of each change object.

The pair object selecting unit 104 accordingly selects pair objects for the change objects in a decreasing order of highest score of their recognition candidates.

In the example of the image shown in FIG. 3, suppose the objects 4 and 6 are change objects; the highest score (450) of the object 4 is greater than the highest score (400) of the object 6.

First, the pair object selecting unit 104 subjects the object 4 to the pair object processing. Then, after determining the object 4, the pair object selecting unit 104 subjects the object 6 to the pair object processing with or without using the object 4 as the pair object for the object 6.

(Recognition Processing Unit 105)

The recognition processing unit 105 obtains pair information regarding the pair object for a change object from the storage unit 107, and identifies this change object by using the obtained pair information.

(Concrete Example of Processing for Identifying Change Object)

A description of examples of processing through which the recognition processing unit 105 identifies a change object will be given below.

Example 1

In Example 1 of processing for identifying a change object, the recognition processing unit 105 refers to the pair information list of a pair object, and sequentially checks whether or not each of the recognition candidates of the change object corresponds to the pair information contained in the pair information list, in a decreasing order of score of the recognition candidates. Then, the recognition processing unit 105 determines that the corresponding recognition candidate is the identification result of the change object.

Figure 4:
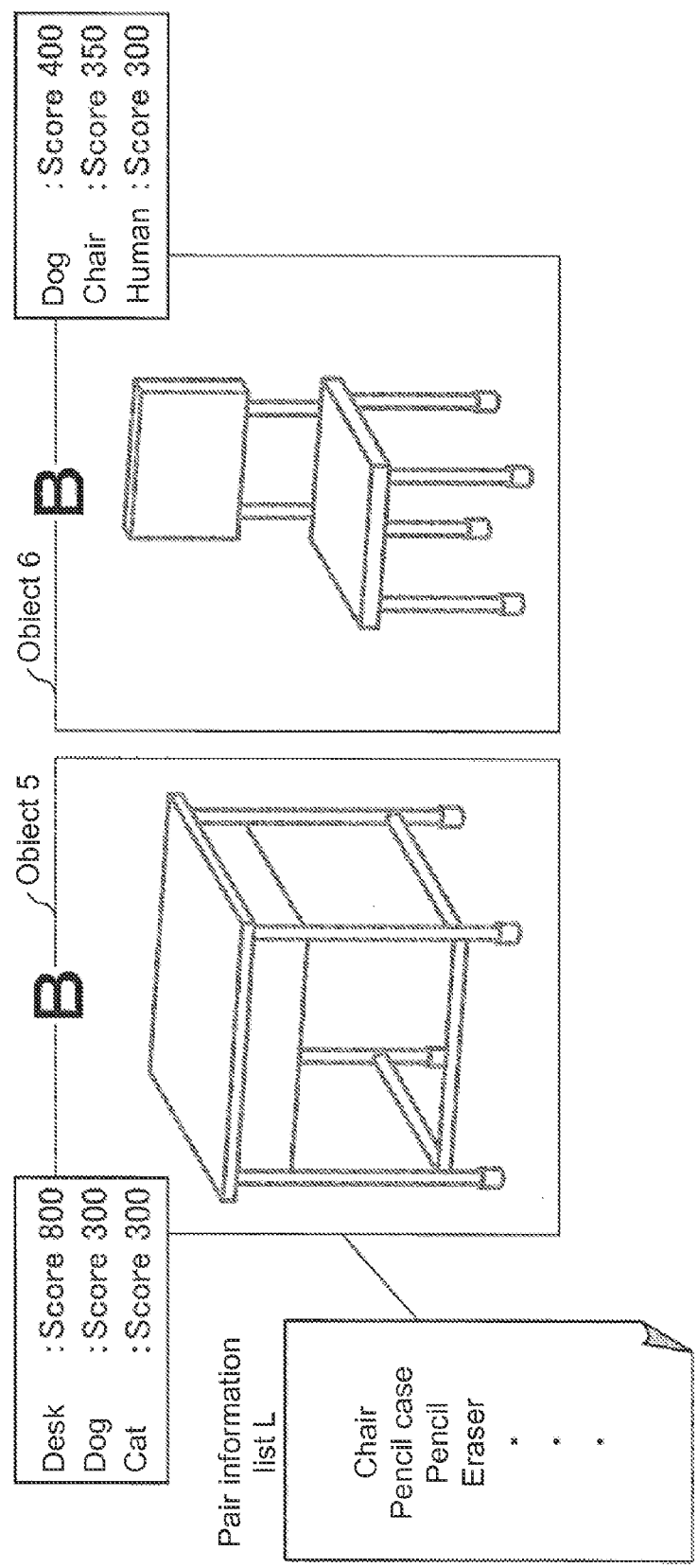
FIG. 4 is also used to explain the general object recognition performed by the image recognition device shown in FIG. 1.

Example 1 will be described with reference to FIG. 4; objects 5 and 6 in FIG. 4 are identical to those in FIG. 3, respectively.

In the example of FIG. 4, suppose the object 6 is a change object; the object 5 is the pair object. As shown in FIG. 4, the object 5 has a pair information list L that contains "chair," "pencil case," "pencil" and "eraser" as pieces of pair information.

In the above configuration, the recognition processing unit 105 checks whether or not "dog," which is the recognition candidate having the highest score for the object 6, is contained in the pair information list L of the pair object, i.e. the object 5. When "dog" is contained in the pair information list L, the recognition processing unit 105 determines that the change object is a dog.

When "dog" is not contained in the pair information list L, the recognition processing unit 105 checks whether or not "chair," which is the recognition candidate having the second highest score for the object 6, is contained in the pair information list L in the object 5. The subsequent processing will be performed likewise.

Example 2

In Example 2 of processing for identifying a change object, the recognition processing unit 105 refers to the pair information list L of the pair object, and sequentially checks whether or not each piece of pair information in the pair information list L is contained in any of the recognition candidates in the change object, in an order from the top piece of pair information to the bottom piece thereof. Then, the recognition processing unit 105 identifies the change object as the contained recognition candidate in the above checking.

In FIG. 4, for example, suppose the object 6 is a change object; the object 5 is a pair object. The recognition processing unit 105 checks whether or not "chair," which is the pair information having the highest priority in the pair information list L of the object 5, is contained in any of the recognition candidates of the change object, i.e. the object 6. Since "chair" is contained in one of the recognition candidates of the object 6, the recognition processing unit 105 identifies the object 6 as a chair.

When "chair" is not contained in any of the recognition candidates of the object 6, the recognition processing unit 105 checks whether or not "pencil case," which is the pair information having the second highest priority in the object 5, is contained in any of the recognition candidates of the object 6. The subsequent processing will be performed likewise.

Through the foregoing processing, the change object, i.e. the object 6, is identified as a chair in the example shown in FIG. 4. In response to this identification, the recognition result ("dog" having the highest score) of the object 6 that has been provided by the general object recognition unit 102 is modified into "chair."

[Modification 1: Weighting of Score]

After detecting the recognition candidate corresponding to the pair information in Example 1 or 2 above, the recognition processing unit 105 may make a score change such that the score of the detected recognition candidate is increased (e.g., by 50%), instead of identifying the change object as the detected recognition candidate.

If the configuration above is employed, the recognition processing unit 105 will identify the change object as the recognition candidate having the highest score, after making the score change.

In the example shown in FIG. 3, the recognition processing unit 105 may increase the score of detected "chair" by 50%, more specifically, change this score from 350 to 525. As a result, the change object 6 is identified as "chair," the score of which has become highest among "dog (score: 400)," "chair (score: 525)" and "person (score: 300)."

The recognition processing unit 105 may also decrease the number of recognition candidates for a change object, before performing the process for identifying the change object. In more detail, before performing the process for identifying a change object, the recognition processing unit 105 may eliminate, from all the recognition candidates for the change object, one or more that do not exceed a preset threshold.

In the example shown in FIG. 3, "dog (score: 400)," "chair (score: 350)" and "person (score: 300)" are shown as the recognition candidates for the object 6. Assuming that the threshold for the scores is set to 325, "person" is eliminated, and "dog" and "chair" are left as recognition candidates for the object 6. Furthermore, assuming that the threshold for the scores is set to 375, "person" and "chair" are eliminated, and only "dog" is left as the recognition candidate for the object 6.

(Flowchart of Processing for Identifying Change Object)

Figure 5:
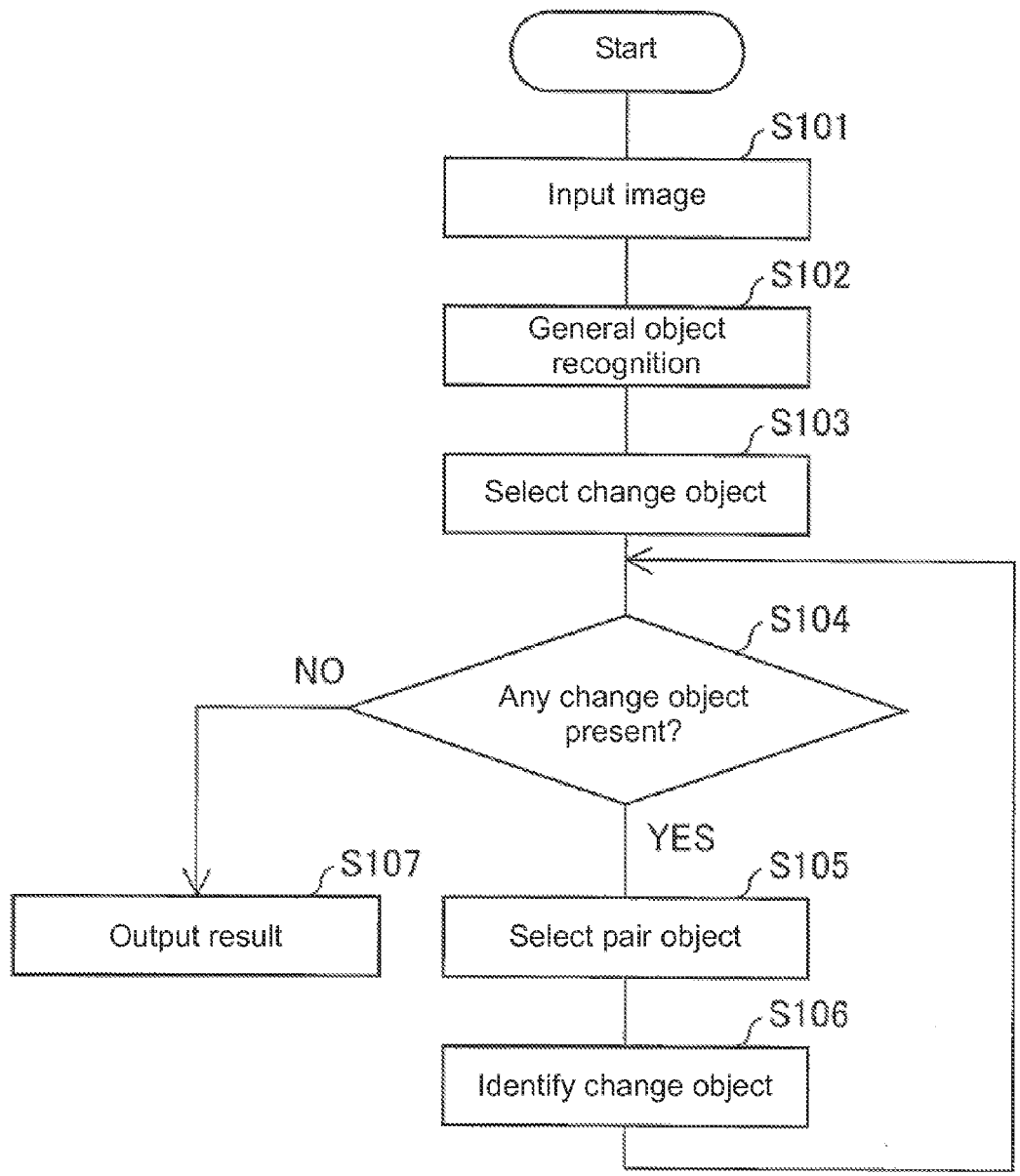
FIG. 5 is a flowchart of the general object recognition performed by the image recognition device shown in FIG. 1.

A description of processing for identifying a change object will be given below with reference to FIGS. 3 and 5; FIG. 5 is a flowchart of this processing.

As shown in the flowchart of FIG. 5, first, the image shown in FIG. 3 externally enters the image obtaining unit 101 (S101). Then, the general object recognition unit 102 subjects this image to the general object recognition, thereby obtaining the objects 1 to 6 in the image and their recognition candidates (S102).

The change object selecting unit 103 selects one or more change objects on the basis of the degrees of reliability (scores) (S103). In more detail, the change object selecting unit 103 selects, as change objects, one or more of the objects 1 to 6 in the image in which the highest scores of the recognition candidates are equal to or lower than a threshold.

The change object selecting unit 103 determines whether or not any change object is present in the image (S104). When it is determined that no change object is present in the image (NO in S104), the recognition processing unit 105 identifies each of the display objects, as one of its recognition candidates of each of the display objects which has the highest score, and then outputs the identification result (S107).

When it is determined that at least one change object is present in the image (YES in S104), the pair object selecting unit 104 selects the pair object for the change object (S105).

Thereafter, the recognition processing unit 105 identifies the change object on the basis of the pair information list L of its pair object and the degrees of reliability (scores) of its recognition candidates (S106).

When no change object is left (NO in S104), the output unit 106 outputs the respective identification results of the display objects that have been provided by the recognition processing unit 105, to the exterior (e.g., image application) (S107).

According to the above configuration, in order to modify the recognition result of the change object, the pair object that makes a pair with this change object is selected from determined objects. In this case, an arbitrary method may be employed to select the pair object for a change object.

The pair object has a pair information list in which an object is associated with this pair object, for example, on the basis of a frequency with which the object appears together with the pair object in the same image.

It is thus possible to identify accurately a type of the change object recognized in an image in which the pair object for the change object is present, by referring to the pair information list.

In the image recognition device according to at least one embodiment of the present invention, the change object selecting unit may select, as the change object, at least one of the display objects in which the highest one of the respective degrees of reliability of the one or more recognition candidates is lower than a preset threshold.

In the configuration above, when a display object has one or more recognition candidates, all of which have degrees of reliability lower than the preset threshold, this display object is regarded as a change object. In contrast, when at least one of the one or more recognition candidates in the display object has a degree of reliability equal to or higher than the preset threshold, this display object is regarded as a determined object. The change object is then identified on the basis of the pair information list in the pair object selected from the determined objects.

Herein, the highest degree of reliability refers to the highest one of the degrees of reliability of one or more recognition candidates.

The threshold may be set such that it reduces the likelihood that the display object is identified as this recognition candidate if one recognition candidate of a certain display object has a degree of reliability lower than the threshold.

Consequently, if a display object has one or more recognition candidates, all of which have degrees of reliability lower than a preset threshold, namely, if a display object has no potential recognition candidates, this display object is selected as a change object and its recognition result is modified.

In the image recognition device according at least one embodiment of the present invention, the change object selecting unit may select, as the change object, one of the display objects in which the highest one of the respective degrees of reliability of the one or more recognition candidates is lower than those of the others of the display objects.

In the configuration above, from one or more recognition candidates of each display object appearing in an image, the recognition candidate that has the highest degree of reliability and the highest likelihood of being each display object are selected as maximum likelihood recognition candidates. Then, these maximum likelihood recognition candidates are compared with one another. Finally, one of the display objects whose maximum likelihood recognition candidate is lower than the others is selected as a change object.

In the case above, out of all the display objects appearing in the image, one that is the most difficult to identify as any recognition candidate can be regarded as a change object.

In the image recognition device according to at least one embodiment of the present invention, when the plurality of determined objects are present in the image, the pair object selecting unit may select one of the determined objects which is disposed the closest to the change object, as the pair object.

In the configuration above, one of the determined objects which is disposed the closest to the change object is regarded as the pair object. The determined object that is disposed the closest to a change object in an image is expected to have been in contact with the change object until recently within a space in which the image was photographed, or to be disposed adjacent to the change object although having not been in contact with the change object until recently.

Therefore, there is a high probability that the above determined object is closely related to the change object, and that the pair information list of this determined object thus contains a correct identification result of the change object.

In conclusion, by regarding one of determined objects which is disposed the closest to a change object as the pair object in the image, the probability that the change object is identified correctly on the basis of the pair information list of this pair object can be increased.

In the image recognition device according to the at least one embodiment of the present invention, when the plurality of determined objects are present in the image, the pair object selecting unit may select one of the determined objects which has the highest degree of reliability, as the pair object.

In the configuration above, the determined object that has the highest degree of reliability is selected as the pair object. In this case, the determined object selected as the pair object is expected to have been identified correctly with a greater probability than any other determined objects.

Therefore, the recognition result of the change object is modified and the change object is identified, on the basis of the pair information list of the pair object having been identified correctly with the greatest probability. This makes it possible to increase the probability that the change object will be identified correctly.

In the image recognition device according to at least one embodiment of the present invention, when the plurality of determined objects are present in the image, the pair object selecting unit may select one or more of the determined objects which belongs to the same type for which the number of the determined objects is the largest, among the plurality of determined objects, as the pair object.

In the configuration above, from the recognition candidates corresponding to the identification results of one or more determined objects, one recognition candidate of the determined objects which belong to the type having largest the number of the determined objects the is found. Then, any of the determined objects corresponding to the found recognition candidate is selected as the pair object.

Out of the recognition candidates corresponding to the identification results of one or more determined objects, one of the determined objects which belong to the type having the largest number of the determined objects becomes the pair object.

Therefore, most of the largest number of determined objects above have a high probability of being an object according to the identification result of the pair object. This means that there is a high probability that the pair object has been identified correctly.

In the case above, the recognition result of the change object is modified and this change object is identified, on the basis of the pair information list in the pair object having been identified correctly with the highest probability. This makes it possible to increase the probability that the change object will be identified correctly.

In the image recognition device according to at least one embodiment of the present invention, the recognition processing unit may sequentially check whether or not each of the one or more recognition candidates of the change object corresponds to any piece of pair information contained in the pair information list, in a decreasing order of degree of reliability of the recognition candidates. When a piece of pair information that corresponds to one of the one or more recognition candidates is detected, the change object may be identified as this piece of pair information.

In the configuration above, the recognition processing unit may sequentially check whether or not each of the recognition candidates corresponds to any piece of pair information contained in the pair information list of a pair object, in a decreasing order of degree of reliability of the recognition candidates. The detected recognition candidate whose corresponding piece of pair information has been detected has the highest degree of reliability among all the recognition candidates whose corresponding pairs of pair information are present in the pair information list.

Therefore, the change object is identified, as one of the recognition candidates which has the highest degree of reliability among all the recognition candidates whose corresponding objects are present in the pair information.

It is thus possible to identify a change object correctly with a greater probability than a configuration in which a change object is identified as one of the recognition candidates which has the second highest or lower degree of reliability among all the recognition candidates whose corresponding pieces of pair information are present in the pair information.

In the image recognition device according to at least one embodiment of the present invention, the recognition processing unit may sequentially check whether or not each piece of the pair information in the pair information list corresponds to any of the one or more recognition candidates contained in the change object, in a decreasing order of priority of the pieces of pair information. When one of the one or more recognition candidates which corresponds to any piece of pair information is detected, the change object may be identified as this piece of pair information.

The priority of each piece of pair information in the pair information list may be determined on the basis of a frequency with which the pair object having this pair information list appears together with a corresponding piece of pair information in the same image within a database.

Alternatively, the priority of each piece of pair information in the pair information list may be determined on the basis of a frequency with which a corresponding piece of pair information is empirically or typically disposed in combination with the pair object having this pair information list.

In the configuration above, the recognition processing unit sequentially checks whether or not each piece of the pair information in the pair information list corresponds to any of the recognition candidates contained in the change object, in a decreasing order of priority of the pieces of pair information. The detected piece of pair information which corresponds to any of the recognition candidates of the change object has the highest priority among pieces of pair information in the pair information list which corresponds to any of the recognition candidates of the change object.

Therefore, the change object is identified, as one of the pieces of pair information which has the highest priority among pieces of pair information which correspond to any of the recognition candidates of the change object.

It is thus possible to identify a change object correctly with a greater probability than a configuration in which a change object is identified as one of the pieces of pair information which has the second or lower highest priority among pieces of pair information which correspond to any of the recognition candidates of the change object.

In the image recognition device according to at least one embodiment of the present invention, the recognition processing unit may refer to the pair information list, weight the respective degrees of reliability of one or more the recognition candidates of the change object so that the respective degrees of reliability of the one or more recognition candidates which corresponds to any piece of pair information contained in the pair information list are increased, and then identify the change object as one of the one or more recognition candidates of the change object which has the highest degree of reliability.

In the configuration above, when one of the recognition candidates which corresponds to any piece of pair information contained in the pair information list is detected, the recognition processing unit weights the degree of reliability of the detected recognition candidate, instead of identifying the change object as the detected recognition candidate.

Therefore, by weighting the degree of reliability of a recognition candidate corresponding to any piece of pair information contained in the pair information list so that this degree of reliability increases, the likelihood that the change object is this recognition candidate can be increased.

In the case above, a weight to be added to the degree of reliability of a recognition candidate corresponding to any piece of pair information in the pair information list may vary depending on the priority of this pair information. This makes it possible to increase the degree of reliability of a recognition candidate whose corresponding pair information in the pair information list has an increased priority.

In the image recognition device according to at least one embodiment of the present invention, when the change object selecting unit selects a plurality of change objects, the recognition processing unit may identify the change objects in a decreasing order of the highest degree of reliability of each recognition candidate.

In the configuration above, the change objects are identified in a decreasing order of degree of reliability.

For example, suppose a first change object has the highest degree of reliability and a second change object has the second highest degree of reliability; the recognition processing unit identifies the first and second change objects in this order. In identifying the second change object, the recognition processing unit can use the identified first change object as the pair object for the second change object.

As a change object has an increased degree of reliability, the likelihood increases that this change object is a recognition candidate having this highest degree of reliability. Therefore, a change object that has an increased highest degree of reliability is identified correctly with an increased probability. In other words, a change object that has a decreased highest degree of reliability is identified correctly with a decreased probability.

Suppose a third change object has a high probability of being identified correctly; a fourth change object has a low probability of being identified correctly. It is believed to be possible to identify both the third and fourth change objects more correctly by first identifying the third change object and then identifying the fourth change object using this third object as the pair object than by first identifying the fourth change object and then identifying the third change object using this fourth object as the pair object.

Therefore, the configuration above is believed to be able to identify correctly a plurality of change objects with a greater probability than a configuration in which a plurality of change objects are identified in an increasing order of highest degree of reliability of each change object.

In the image recognition device according to at least one embodiment of the present invention, when the determined objects are not present in the image, the recognition processing unit may identify the change object as one of the one or more recognition candidates of the change object which has the highest degree of reliability.

In the configuration above, a certain change object is identified, as one of its recognition candidates which has the highest degree of reliability. For example, a change object that has the greatest highest degree of reliability may be identified and regarded as a determined object.

Consequently, at least one determined object is contained in an image. Then, by using this determined object as the pair object, a change object can be identified in the above manner.

Two display objects that appear together in a plurality of images photographed in the past with a higher frequency than a preset number may be contained in the pair information list while being related to each other.

In the configuration above, a plurality of images in a database are first subjected to the general object recognition by a high-performance image recognition device. Consequently, display objects appearing in the plurality of images are recognized and identified.

Then, one or more pairs of display objects that appear together in the same image are extracted from the identification result of the display objects. Consequently, respective frequencies with which the pairs of display objects appear in the same image can be determined.

Finally, one or more pairs of display objects that appear together in a preset number of images are extracted, and each extracted pair of display objects is contained in the pair information list while being related to each other.

In the above manner, two display objects that appear together in the same image with a frequency equal to or higher than a preset number and would be arranged in a pair or used in combination can be contained in the pair information list while being related to each other.

The image recognition device according to at least one embodiment of the present invention may be implemented using a computer. In this case, an image recognition program for the image recognition device which allows a computer to implement the image recognition device by operating the computer as the individual units provided in the image recognition device, as well as a non-transitory computer readable recording medium which stores this image recognition program also fall into categories of the present invention.

According to at least one embodiment of the present invention, there is provided an image recognition device for recognizing respective types of display objects appearing in an image, and obtains, for each display object, one or more recognition candidates, each of the one or more recognition candidates has a degree of reliability that indicates a likelihood as a result of recognizing the types of the display objects, the image recognition device comprising: a change object selecting unit configured to select a change object from the display objects and to determine that a type of each determined object is a type of one of the one or more recognition candidates which has the highest degree of reliability, the change object being a target whose recognition result is to be modified and the determined objects being not the target whose recognition result is to be modified; a pair object selecting unit configured to select a pair object from the determined objects of the display objects, the pair object making a pair with the change object; and a recognition processing unit configured to modify the recognition result of the change object and to identify the change object, on the basis of a pair information list that indicates an object type associated with a type of the pair object.

According to at least one embodiment of the present invention, there is provided an image recognition method of recognizing respective types of display objects appearing in an image, and obtaining, for each display object, one or more recognition candidates, each of the one or more recognition candidates has a degree of reliability that indicates a likelihood as a result of recognizing the types of the display objects, the image recognition method comprising: selecting a change object from the display objects and determining that a type of each determined object is a type of one of the one or more recognition candidates which has the highest degree of reliability, the change object being a target whose recognition result is to be modified and the determined objects being not the target whose recognition result is to be modified; selecting a pair object from the determined objects of the display objects, the pair object making a pair with the change object; and modifying the recognition result of the change object and identifying the change object, on the basis of a pair information list that indicates an object type associated with a type of the pair object.

According to at least one embodiment of the present invention, an effect of identifying accurately a type of a display object appearing in an image is produced.

(Difference from the Invention Described in Japanese Unexamined Patent Publication No. 2010-9440)

The technique described in Japanese Unexamined Patent Publication No. 2010-9440 weights candidate letters for each letter on the basis of the number of its occurrence in word registration information in which a plurality of words are registered. Then, the technique eliminates one or more of the candidate letters, depending on the result.

The technique described above therefore differs from the change object identifying unit 10 according to Embodiment 1 of the present invention in that the technique does not evaluate recognition candidates by using the degrees of reliability (scores) and a threshold.

The change object identifying unit 10 can change the degree of reliability of each recognition candidate by adjusting its score, and decrease the number of recognition candidates by changing a threshold. In contrast, the technique described in the document above cannot evaluate recognition candidates on the basis of the degrees of reliability and/or a threshold.

The present invention is not limited to the foregoing embodiment; various modifications thereto are possible within the scopes of the claims. Any embodiments made by combining, as appropriate, technical ideas disclosed in different embodiments are also included in the technical scope of the present invention. A novel technical feature can be conceived of by combining technical ideas disclosed in different embodiments.

[Exemplary Implementation Using Software]

Each block constituting the image recognition device 1, in particular, the change object identifying unit 10, may be implemented using either hardware including a logic circuit incorporated in an integrated circuit (IC chip) or software executable by a central processing unit (CPU).

If the latter case is employed, the image recognition device 1 includes: a CPU that executes program commands for fulfilling various functions; a read only memory (ROM) that stores programs; a random access memory (RAM) that expands the programs; a storage device (recording medium), such as a memory, that stores the programs and various types of data; and the like. Objects of the present invention can also be accomplished by: preparing a recording medium that stores program codes of control programs (execute-formed, intermediate code and source programs) for the image recognition device 1 in a computer-readable manner, the control programs being software for fulfilling the functions above: supplying the recording medium to the image recognition device 1; and causing the computer (CPU or MPU) to read and execute the program codes stored in the recording medium.

The recording medium above may be a non-transitory tangible medium. Examples of such a non-transitory tangible medium includes: a tape material such as a magnetic or cassette tape; a magnetic disk such as a Floppy™ or hard disk; a disc material including an optical disc such as CD-ROM, MO, MD, DVD or CD-R; a card material such as an IC card (including a memory card) or an optical card; a semiconductor memory material such as a mask ROM, an EPROM, an EEPROM™ or a flash ROM; and a logic circuit material such as a programmable logic device (PLD) or a field programmable gate array (FPGA).

The image recognition device 1 may be configured to be connectable to a communication network, and be supplied with the program codes through the communication network. This communication network is not limited to a specific one, and may be any network that enables program codes to be transmitted. For example, an Internet, an intranet, an extranet, a LAN, an ISDN, a VAN, a CATV communication network, a virtual private network, a telephone line network, a mobile communication network, and a satellite communication network can be used. A transmission scheme configuring the communication network is not limited to a specific configuration or type, and may be any scheme that enables program codes to be transmitted. The wired transmission scheme may include IEEE 1394, and use a USB cable, a power line, a cable TV line, a telephone line, an asymmetric digital subscriber Line (ADSL), or the like. The wireless transmission scheme may be infrared transmission scheme such as IrDA or any given protocol used for a remote controller, or radio transmission scheme such as Bluetooth™, IEEE 802.11, a high data rate (HDR), a near field communication (NFC), or a digital living network alliance (DLNA). In addition, the wireless transmission scheme may use a portable phone network, a satellite line, or a digital terrestrial television network. The present invention may be implemented using a computer data signal that is embodied through the electrical transmission of the program codes and is embedded in a carrier.

The present invention is applicable to, for example, image recognition devices that recognize a display object appearing in an image.

The invention claimed is:

1. An image recognition device for recognizing respective types of display objects appearing in an image, and obtaining, for each display object, one or more recognition candidates, each of the one or more recognition candidates having a degree of reliability that indicates a likelihood as a result of recognizing the types of the display objects, the image recognition device comprising a processing unit or a logic circuit forming:

a change object selecting unit configured to select a change object from the display objects and determine that a type of each determined object is a type of one of the one or more recognition candidates having the highest degree of reliability, the change object being a target whose recognition result is to be modified and the determined objects being not the target whose recognition result is to be modified;

a pair object selecting unit configured to select a pair object from the determined objects of the display objects, the pair object making a pair with the change object; and a recognition processing unit configured to modify the recognition result of the change object and identify the change object, on the basis of a pair information list stored in a storage unit, the pair information list indicating an object type associated with a type of the pair object.

2. The image recognition device according to claim 1, wherein the change object selecting unit is configured to select, as the change object, at least one of the display objects in which the highest one of the respective degrees of reliability of the one or more recognition candidates is lower than a preset threshold.

3. The image recognition device according to claim 1, wherein the change object selecting unit is configured to select, as the change object, one of the display objects in which the highest one of the respective degrees of reliability of the one or more recognition candidates is lower than those of the others of the display objects.

4. The image recognition device according to claim 1, wherein when the determined objects are not present in the image, the change object selecting unit is configured to identify the change object as one of the one or more recognition candidates of the change object which has the highest degree of reliability.

5. The image recognition device according to claim 1, wherein when the plurality of determined objects is present in the image, the pair object selecting unit is configured to select one of the determined objects which has the highest degree of reliability, as the pair object.

6. The image recognition device according to claim 1, wherein when the plurality of determined objects is present in the image, the pair object selecting unit is configured to select one of the determined objects which is disposed the closest to the change object, as the pair object.

7. The image recognition device according to claim 1, wherein when the plurality of determined objects are present in the image, the pair object selecting unit is configured to select one or more of the determined objects which belong to the same type for which the number of the determined objects is the largest, among the plurality of determined objects, as the pair object.

8. The image recognition device according to claim h wherein the recognition processing unit is configured to sequentially check whether or not each of the one or more recognition candidates of the change object corresponds to any piece of pair information contained in the pair information list, in a decreasing order of degree of reliability of the recognition candidates, and when a piece of pair information that corresponds to one of the one or more recognition candidates is detected, the change object is identified as the piece of pair information.

9. The image recognition device according to claim 1, wherein the recognition processing unit is configured to sequentially check whether or not each piece of pair information in the pair information list corresponds to any of the one or more recognition candidates contained in the change object, in a decreasing order of priority of the pieces of pair information, and when one of the one or more recognition candidates which corresponds to the pair information is detected, the change object is identified as the piece of pair information.

10. The image recognition device according to claim 1, wherein the recognition processing unit is configured to refer to the pair information list, weights the respective degrees of reliability of the one or more recognition candidates of the change object so that the respective degrees of reliability of the one or more recognition candidates which corresponds to any piece of pair information contained in the pair information list are increased and identify the change object as one of the one or more recognition candidates of the change object which has the highest degree of reliability.

11. A non-transitory computer-readable recording medium storing an image recognition program that causes a computer to function as the image recognition device according to claim 1.

12. An image recognition method for recognizing respective types of display objects appearing in an image, and obtaining, for each display object, one or more recognition candidates, each of the one or more recognition candidates has a degree of reliability that indicates a likelihood as a result of recognizing the types of the display objects, the image recognition method comprising:

selecting at least one change object from the display objects and determining that a type of each determined object is a type of one of the one or more recognition candidates which has the highest degree of reliability, the change object being a target whose recognition result is to be modified and the determined objects being not the target whose recognition result is to be modified;

selecting a pair object from the determined objects of the display objects, the pair object making a pair with the change object; and modifying the recognition result of the change object and identifying the change object, on the basis of a pair information list that indicates an object type associated with a type of the pair object.

* * * * *